United States Patent [19]
Struyk et al.

[11] 3,892,850
[45] July 1, 1975

[54] PIMARICIN AND PROCESS OF PRODUCING SAME

[75] Inventors: Adrianus Petrus Struyk; Jacques Maurits Waisvisz, both of Delft, Netherlands

[73] Assignee: Gist-Brocades N.V., Delft, Netherlands

[22] Filed: Mar. 7, 1957

[21] Appl. No.: 644,609

[30] Foreign Application Priority Data
Mar. 13, 1956  Netherlands ...................... 5620534

[52] U.S. Cl. .................................. 424/119; 195/80
[51] Int. Cl. ............................................ A61k 21/00
[58] Field of Search ........................ 424/119; 195/80

[56] References Cited
UNITED STATES PATENTS
2,649,401  8/1953  Haines et al. ........................ 195/51

FOREIGN PATENTS OR APPLICATIONS
712,547  7/1954  United Kingdom

OTHER PUBLICATIONS
Waksman, The Actinomyces, 1950, page 30.
Symposium Actinomycetes, 6th Cong. Intern. Microb., Rome, 1953, page 31.
Pridham, Applied Microbiology, Jan. 1958, pp. 52–79.
Sneath, J. Gen. Microbiology, Aug. 1957, pp. 184–200.
Raubitschek et al., Antibiotics and Chemotherapy, April 1952, pp. 179–183.
Schaffner et al., Antibiotics Annual, 1957–1958, pp. 869–877.
Baldacci, Archiv fur Mikrobiologie, Bd. 20, S. 347/357, 1954.
Wakaki et al., J. of Antibiotics, 1953, pp. 145–146.
J. Waksman, "Actinomycetes and their Antibiotics", 1953, pp. 176, 177, 183, & 184.

*Primary Examiner*—Jerome D. Goldberg
*Attorney, Agent, or Firm*—Hammond & Littell

[57] ABSTRACT

This invention relates to an antifungal antibiotic pimaricin produced by culturing Streptomyces natalensis and the process of preparing said antibiotic.

6 Claims, 1 Drawing Figure

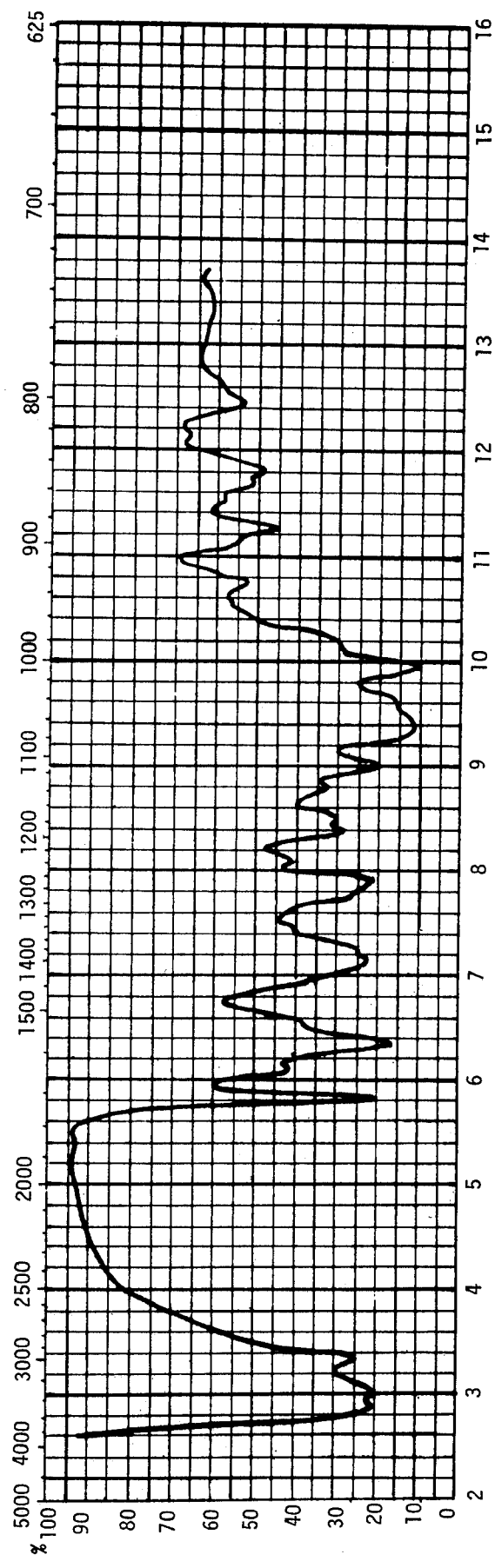

PIMARICIN AND PROCESS OF PRODUCING SAME

This invention relates to a new and useful antibiotic and to a process for the biosynthesis of the new antibiotic, called pimaricin, by means of a hitherto unknown Streptomyces species. For this purpose a culture is made of Streptomyces natalensis nov. spec., whose properties are described below, by the aerobic method and under appropriate conditions, and the product generically named pimaricin thus formed, whose properties are likewise given below, is obtained from the fermentation medium. The preparation of the antibiotic from the culture fluid and/or the mycelium can be advantageously effected by extraction with alcohols miscible with water to a limited extent, e.g., butanol or by a treatment with methanol (a methanol solution of calcium chloride), followed by concentrating the extract and subsequent purification with the aid of solvents.

The micro-organism which produces the antibiotic in question was isolated from a soil sample obtained from Pieter Maritzburg, in the province of Natal, South Africa. It is an actinomycete of the Streptomyces genus, now called Streptomyces natalensis.

A culture of Streptomyces natalensis is on deposit with the Centraalbureau voor Schimmelcultures, Baarn, the Netherlands, under the culture number CBS 700.57 and with the Culture Collection Unit of the Northern Utilization Research and Development Division of the United States Department of Agriculture under the culture number NRRL 2651.

The morphological and physiological characteristics of the micro-organism are as follows:

Morphological characteristics: Hyphae branched, irregularly twisted, in the growth zone often practically straight and parallel to one another, 0.3 – 0.7 $\mu$ thick, generally of uniform thickness, but also sometimes with local thickenings. Sporulating hyphae as monopodial lateral branches at the aerial mycelium. Spores in irregularly undulated chains, seldom in chains wound in loose spirals. Spores separated from one another by short intermediate pieces without protoplasm, oval, round or tangerine shaped, 0.7 – 1.2 × 0.7 – 0.8 $\mu$.

Culture characteristics when grown on the substrates listed (after 7 days at 25°C., unless otherwise indicated) are:

TABLE I (The colors mentioned have been taken from Ridgway, Color Standards and Nomenclature [1912]).

| | |
|---|---|
| Oatmeal agar | Good growth. Vegetative mycelium and back colorless. After 28 days a few colonies at the bottom and the top of the tube. Chamois at the back, after 57 days slightly darker (warm buff). Colony practically flat, separate colonies slightly elevated at the center. Aerial mycelium pale mouse gray to light mouse gray, powdery and felty, after 28 days one-third gray, after 57 days drab gray. Smell earthy with sourish additional smell. No soluble pigment. |
| Potato agar | Moderate growth. Vegetative mycelium light mineral gray to pale olive buff. Back: cream color, after 57 days cream buff to chamois. Colonies moist, slightly elevated aerial mycelium partly covering the colony. Aerial mycelium after 7 days white and felty, after 28 days drab gray and covering the colony for 30 – 70%. No soluble pigment. Smell unpleasantly earthy. |
| Potato | Good growth. Vegetative mycelium moist, elevated lumpy, pale pinkish buff to pinkish buff, after 28 days deep olive buff. Back on glass wall after 28 days chamois. After 7 days no aerial mycelium. After 28 days a good deal of aerial mycelium, at first white, afterwards pale mouse gray, after 57 days drab gray. Potato after 7 days not discolored, after 57 days, like the fluid at the bottom of the tube, discolored to buffy brown. Smell earthy. |
| Sabouraud-glucose agar | Moderate growth. Vegetative mycelium, lumpy, elevated after 7 days olive buff like back, after 28 days darker (deep olive buff to dark olive buff). Back now clay color. Aerial mycelium at first white, short and felty, afterwards pale mouse gray. No soluble pigment visible after 7 days, but after 57 days medium auburn. |
| Emerson agar | Very good growth. Vegetative mycelium olive buff. Back appearing darker (cream buff to chamois). Aerial mycelium short and felty, white. No soluble pigment. Smell strongly earthy. |
| Starch agar | Moderate growth. Vegetative mycelium and back pale olive buff. Colony slightly elevated, covered for about one half by felty white aerial mycelium. No soluble pigment. Smell strongly earthy. |
| Glucose nitrate agar | Good growth. Round, moist, gray colonies, slightly elevated in the center, about 2 to 2.5 mm in diameter (lighter than pale olive buff). Aerial mycelium scanty, in dots or concentric rings, felty, white. No soluble pigment. Smell earthy. |
| Sodium citrate agar | Very poor growth. Round, moist, gray colonies, slightly elevated in the center, about 1 mm in diameter (lighter than pale olive buff). Back pale olive buff. No soluble pigment. No smell. |
| Nutrient agar | Good growth. Colony moist, slightly elevated, very small, wet tufts, rough and dull, with shallow and indistinct cerebroid ridges, cream color to cream buff. Smell unpleasant. No soluble pigment. |
| Czapek agar (13 days) | Growth very scanty. Vegetative mycelium hyaline. No aerial mycelium. No soluble pigment. |
| Bacto agar 2% | Growth very scanty, not visible until after 13 days. Vegetative mycelium hyaline. No aerial mycelium. No soluble pigment. |

The organism which is used according to the invention for the preparation of pimaricin belongs to the Streptomyces genus and is not identical with any Streptomyces species heretofore described. In view of the characteristics mentioned in detail above it belongs in Group 1 of those distinguished by Waksman in Bergey's Manual (see also S. A. Waksman, "The Actinomycetes", 1950, p. 30).

Streptomyces natalensis nov. spec. can also be classed in the series "Neo-Ingri" of Baldacci (cf. Symposium Antinomycetales, VIth Congr. Intern. Microb. Roma, 1953, page 31). It is to be noted that the same Streptomyces natalensis nov. spec. is not exclusively confined to actinomycetes which answer in a stereotyped and rigorous manner to the description given herein, but that the term also includes all related strains which broadly have the same specific properties and produce the antibiotic pimaricin, and which might be regarded as sub-species, varieties, races, forms, groups of serological or other types, variants, phases, spontaneous mutants, modifications and the like of this species. It also covers the mutants of Streptomyces natalensis which can be obtained from it with the aid of means or substances causing mutation, such as irradiation or treatment with substances having a toxic effect.

The new antibiotic pimaricin is mainly active in relation to saprophytic and parasitic fungi and yeasts.

Table II gives a survey of the antibiotic properties of pimaricin in relation to yeasts and fungi not pathogenic to the human body. For each speices the quantity of the antibiotic in micrograms/ml of nutrient medium is given which just causes checking of the growth.

Table III lists the similar checking of a number of yeasts and fungi pathogenic to the human body.

TABLE II

| Test Organism | Concentration of Pimaricin in Micrograms/ml Which Inhibits Growth |
| --- | --- |
| Saccharomyces cerevisiae-H | 0.15 |
| Saccharomyces cerevisiae-KLL | 0.9 |
| Pichia membranifaciens | 2.5 |
| Schwanniomyces occidentalis | 2.5 |
| Aspergillus niger | 1.8 |
| Aspergillus fumigatus | 1.2 |
| Cladosporium cucumerinum | 0.9 |
| Verticillium dahliae | 1.2 |
| Fusarium spec. | 1.2 |
| Penicillium chrysogenum | 0.6 |
| Trichoderma spec. | 1.2 |

TABLE III

| Test Organism | Concentration of Pimaricin in Micrograms/ml (on Sabouraud Agar) Which Inhibits Growth |
| --- | --- |
| Candida albicans (3 strains) | 6 – 12 |
| Candida tropicalis[1] (2 strains) | 3 – 12 |
| Trichosporon cutaneum[1] | 12 |
| Pityrosporum spec.[1] | 12 |
| Candida parapsilosis[1] | 12 |
| Histoplasma capsulatum | 3 |
| Sporotrichum Schenckii | 6 |
| Trichophyton sulfuricum | 3 |
| Trichophyton mentagrophytes (3 strains) | 50 |
| Trichophyton violaceum | 6 |
| Trichophyton rosaceum | 12.5 |
| Trichophyton Schonleinii | 6 |
| Trichophyton rubrum | 12.5 |
| Trichophyton interdigitale | 25 |
| Microsporum lanosum | 12.5 |
| Epidermophyton floccosum | 12.5 |
| Hormodendrum compactum | 6 |

[1]This yeast is not called pathogenic, but it was isolated from medical material.

From the above tables, among other things a clear and striking action against phytopathogenic fungi, such as Verticillium, Cladosporium, and Fusarium, becomes apparent. The checking of Candida albicans, too, is very strong.

A further important feature of the new antibiotic is the very slight phytotoxic effect of pimaricin in contrast to most of the fungicidal antibiotics hitherto found. In view of this, the new antibiotic is very suitable, among other things, in agriculture and horticulture, as a means for combating plant diseases, the more so as it has been found to diffuse easily and to act systematically.

Thus pimaricin will penetrate e.g., into pea seeds (Pisum sativum) after steeping in a dilute aqueous solution. This appears from the fact that pimaricin can be extracted from the cotyledons and the germs of these treated seeds.

Tables IV a and b show the internal disinfectant action. The fungus mycelium (among other things, Ascochyta pisi) is killed in the seed.

TABLE IV a

| Concentration Pimaricin in p.p.m.[1] | % of Seeds With Mycelium[2] |
| --- | --- |
| 150 | 0 |
| 75 | 3 |
| 37.5 | 11 |
| 18.7 | 25 |
| blank (untreated) | 80 |

TABLE IV b

| Concentration Pimaricin in p.p.m.[1] | % of Diseased Plants | |
| --- | --- | --- |
| | Test I | Test II |
| 150 | 0 | 0 |
| 75 | 0 | 0.7 |
| 37.5 | 1 | 2 |
| 18.7 | 2 | 3.6 |
| blank | 15 | 24 |

[1]aqueous solution in which the seeds were steeped for 24 hours at 20°C.
[2]development of mycelium on filter paper Detailed tests indicated that pimaricin in a concentration of 75 p.p.m., which is effectively fungicidal, is not prejudicial to the germination of pea seeds and the growth of the plant (see Tables IV c and d).

TABLE IV c

| Concentration Pimaricin in p.p.m. [1] | % of Germinated Seeds [2] | Length of Roots in mm after 3 Days [2] |
| --- | --- | --- |
| blank | 100 | 23 |
| 25 | 100 | 24 |
| 50 | 100 | 22 |
| 75 | 100 | 22 |
| 100 | 100 | 23 |
| 125 | 100 | 22 |
| 150 | 96 | 29 |
| 200 | 98 | 14 |

[1] aqueous solution in which the seeds were steeped for 24 hours at 20°C.
[2] seeds arranged on moist filter paper TABLE IV d

| | Pea Seeds Steeped in Water | in concentration Pimaricin 75 p.p.m. [1] |
| --- | --- | --- |
| sprouting (number) | 126 | 128 |
| length of plant in cm after 2 months | 31.8 | 33.8 |
| number of pods per plant | 2.8 | 2.8 |

[1] aqueous solution in which the peas were steeped for 24 hours at 20°C.

All the data given in the tables refer to the Pea race Eminent, which is extremely sensitive to Ascochyta pisi.

Experiments with rats and mice indicate very low toxicity. To determine the acute albinorat toxicity of pimaricin, material assaying 985 micrograms/mg was administered to rats, which were then held 7 days and posted.

The following results were obtained with pimaricin suspension in water:

| | | |
| --- | --- | --- |
| $LD_{50}$ oral | 1,500 mg/kg | |
| $LD_{50}$ intramuscular | >2,000 mg/kg | average values of tests with 40 rats |
| $LD_{50}$ subcutaneous | >5,000 mg/kg | |
| $LD_{50}$ intraperitoneal | 250 mg/kg | |

Pimaricin has no irritating effect on the skin and mucous membranes.

In the pure state pimaricin is a white crystalline compound with an amphoteric character, salts of which can be made in the usual ways. With $FeCl_3$ it gives no color reaction; with concentrated phosphoric acid a pink, unstable color is produced. Concentrated hydrochloric acid and sulphuric acid produce a blue and olive-green discoloration. The antibiotic decolorizes bromine water. Because of this and also in view of the infra red and ultra violet spectra (see below) it is indicated that pimaricin is one of the socalled polyene antibiotics. The solubility in water is very slight, viz 8 mgs in 100 ml at 20°C. In organic solvents, such as alcohols, glycols and ketones, the antibiotic is better soluble, especially in alcohols with 1 to 6 carbon atoms, e.g., in methanol and n-butanol and in the so-called cellosolves. Further it is soluble in pyridine, dimethylformamide, dimethylacetamide, glacial acetic acid and alkali hydroxide. In aliphatic hydrocarbons, such as pentane, hexane, cyclohexane and the like, the substance is practically insoluble.

At room temperature pimaricin is a very stable compound. A solution in water (5 mg in 100 ml) preserves its full activity for 7 days at pH = 7.0 at 25°C. At pH = 2.0 this solution loses 50% of its activity in 3 days at the said temperature. At pH = 10 and at 25°C. the half value time is 6 days. At elevated temperatures the solution is less stable. Thus a solution of the above given concentration of pimaricin in water at pH = 2 and 90°C. loses 90% of its activity in 15 minutes, at pH = 6.5: 15% and at pH = 9: 50% of its activity. In methanol pimaricin is stable at higher (25°–60°C.) temperatures. The antibiotic activity of the pimaricin was tested microbiologically with Saccharomyces cerevisiae - Holland strain as test organism in relation to a pure standard preparation.

Pimaricin does not exhibit a melting point, but begins to decompose at about 150°C. The specific rotation $\alpha$ 25/D = + 250° ($c$ = 0.083% in 100% methanol). The molecular weight of the substance is about 685. The presumed empirical formula is $C_{34}H_{49}NO_{14}$. The elementary analysis gave the following values: C 57.77% H 7.27%, N 1.95% and O 33.01% (calculated).

The ultra violet absorption spectrum of pimaricin is characterized by maxima at 290, 304 and 318 m$\mu$ with a shoulder at about 280 and a minimum at about 250 m$\mu$ (C = 3.93 micrograms/ml in methanol). A sample of pimaricin pressed into a potassium bromide plate (C = 0.5%) exhibits the following infra red absorption (in $cm^{-1}$): 3460, 2985, 1721, 1637, 1577, 1441, 1401, 1381, 1275, 1269, 1238, 1192, 1176, 1136, 1109, 1066, 1006, 988, 948, 887, 855, 844, 803, 794 (for the underlined wave lengths the absorption is strong to very strong).

FIG. 1 is a graph of the infra red spectrum of pimaricin in a potassium plate.

For the preparation of pimaricin the Streptomyces natalensis is cultivated aerobically in stationary cultures or submerged in a fluid nutrient medium under sterile conditions in closed vessels, which are equpped with stirring devices and to which, with a view to aeration, sterile oxygen or air can be supplied during cultivation.

The duration of the cultivation, the temperature, and the other conditions that have to be satisfied in order to obtain good yields of pimaricin are easily determined experimentally. They will be discussed more fully below.

The nutrient medium can be composed of the customary substances; it should contain a source of carbon and a source of fermentable organic and/or inorganic nitrogen, while further the presence of mineral salts, such as phosphates, potassium and sodium salts, and traces of various metals is desirable. However, the initial substances used in practice are often sufficiently contaminated with these mineral salts, so that extra additions of them are superfluous.

For the source of carbon, soluble as well as insoluble carbohydrates, such as glucose, saccharose, lactose or starch, can be used. Sugar alcohols, such as glycerol, are also suitable. The amount of the source of carbon in the medium may vary widely, dependent on the nature of the carbohydrate used and on the further composition of the medium: in general it is approximately between 0.5 and 5% of the weight of the medium.

For the source of nitrogen a great many substances can be used. Mention may be made of hydrolyzed or nonhydrolyzed casein, corn steep liquor, peptone, extract of meat, soybean meal (defatted or not), peanut meal, fish meal, nitrates. The choice of the source of nitrogen will usually depend on the further composition of the medium, which in turn will be chosen such that the antibiotic is prepared in the most economical manner. In this connection it may be mentioned that small amounts of nitrogeneous initial materials, such as yeast extract, distillers' solubles, fish solubles, etc. will considerably enhance the yield of pimaricin in particular media. Also lipoid substances, such as fatty oils, both of vegetable and animal origin (e.g., soy oil and fish oil) are capable of enhancing the yield to a substantial degree.

The duration of the fermentation is highly dependent on the composition of the nutrient medium. Usually it varies between 48 and 120 hours, but the fermentation may also be continued for a longer time if desired, e.g., up to 14 days, if the increased yield of antibiotic thus obtained justifies the greater expense of a longer fermentation cycle.

The temperature at which the fermentation is carried out may in principle vary between 15° and 30°C. Temperatures of about 26° - 28°C. are preferred.

With optimum growth of the micro-organism and yield of pimaricin the pH may vary, especially during the first phase of the fermentation, e.g., between 5.0 and 8.0. After the sterilization the nutrient medium is preferably adjusted to a pH between 6 and 7. The fermentation is preferably carried out at a pH between 6.5 and 8, since in this case the highest yields are obtained. the pH can be kept constant during the fermentation by adding alkali hydroxide or acid at regular intervals under sterile conditions. Usually, however, calcium carbonate is used as a kind of buffer, in quantities varying from 0.2 to 1.0% by weight of the medium. The quantity of air which is passed into the medium during the fermentation under sterile conditions is highly dependent on the shape of the vessel, on the velocity, and on the shape of the stirrers. In general this quantity varies between 0.1 and 4 liters per liter of nutrient medium per minute.

For the inoculating material in the main fermentation vessel 48 to 72 hour old precultures of Streptomyces natalensis are preferably used. In order to obtain good yields and prevent fluctuating results the inoculation is preferably effected with amounts of a culture making up 1 to 7% by volume of the nutrient medium in the main fermentation vessel. It is obvious that with large fermentation vessels a few stages of percultures must be used. It is, however, also possible to store a portion of the culture, e.g., 10%, in the main fermentation vessel for the production of a new culture. The whole fermentation can also be carried out continuously.

The pimaricin can be obtained from the culture fluid in several ways. According to the invention use may be made of the solubility of the antibiotic in organic solvents that are miscible with water to a limted extent, such as butanol. The procedure may, for example, be as follows. After a sufficiently active fluid has been obtained, it is adjusted to a pH of about 10 in order to disengage the active substance from the so-called mycelium, upon which the latter is filtered off. The fluid can then be extracted, e.g., with n-butanol, at a pH lying between about 3 and 10. If the fluid is acidified, this is preferably done with phosphoric acid; any precipitate thus formed can be removed and, if necessary, also extracted. The n-butanol extract is concentrated by azeotropic distillation, the crude active substance finally crystallizing. This can be purified by selective precipitation from e.g., glacial acetic acid, pyridine, dimethylformamide and the like. In fermentations with yields higher than 700 micrograms/ml the yield of pimaricin can be increased very materially by extracting the mycelium. In this concentration it is advantageous to use as the extractive agent methanol in which, to increase its capacity as a solvent, 1–3% of calcium chloride has been dissolved.

EXAMPLE I (Preparation of the inoculating culture)

From a tube with a culture of Streptomyces natalensis nov. spec. on e.g., oatmeal agar, on which good sporulation has taken place, small amounts of conidia are transferred under sterile conditions to shaking flasks with a capacity of about 2 liters, into which has been introduced 500 ml of a fluid nutrient medium. This medium consists of:

| | |
|---|---|
| Peptone | 0.5% |
| Concentrated corn steep liquor (50% of dry matter) | 0.6% |
| Glucose | 1.0% |
| Common salt (adjusted to pH = 7.0 with alkali hydroxide) | 1.0% |

After incubation with constant shaking at 26° C. for 48 hours the culture is suitable to be inoculated in the main fermentation medium.

EXAMPLE II (Preparation of the culture)

One liter of the inoculating culture prepared according to Example I is transferred under sterile conditions to a fermentation vessel equipped with a stirrer and a device for blowing in sterile air and containing 15 liters of a culture medium of the following composition:

| | |
|---|---|
| Glucose | 3.0% |
| Concentrated corn steep liquor (50% of dry matter) | 0.2% |
| Ammonium sulphate | 0.5% |
| Potassium chloride | 0.4% |
| Primary potassium phosphate | 0.02% |
| Calcium carbonate | 0.8% |

The above culture medium is adjusted to a pH of 6 to 9 with alkali hydroxide. After 48 hours incubation at 27°C. with constant aeration and stirring the culture is found to contain 610 micrograms of pimaricin per ml.

Other culture media, with which yields of the same order of magnitude can be obtained, may have the following compositions:

| | | |
|---|---|---|
| A. | Peanut meal | 2 % |
| | Potato starch | 1 % |
| | Concentrated corn steep liquor (50% of dry matter) | 2 % |
| | Common salt | 0.5% |
| | Magnesium sulphate | 0.1% |
| | Primary potassium phosphate | 0.05% |
| | Calcium carbonate | 0.6% |
| | Potassium hydroxide to pH 6.5 | |

With this medium, after inoculation with 4% of inoculating culture and 72 hours incubation and aeration at 26°C., 590 micrograms of pimaricin per ml of fermentation fluid was obtained.

| | | |
|---|---|---|
| B. | Beet root molasses (sugar content about 50%) | 4 % |
| | Lactose | 1 % |
| | Concentrated corn steep liquor | 2 % |
| | Sodium sulphate 10 aq. | 0.1% |
| | Calcium carbonate | 0.5% |
| | Potassium hydroxide to pH 7.1 | |

With this medium, after inoculation with 5% of inoculating culture and 120 hours incubation and aeration at 27°C., 640 micrograms of pimaricin per ml of fermentation fluid was obtained.

| | | |
|---|---|---|
| C. | Peptone ("Difco") | 0.5% |
| | Extract of meat ("Difco") | 0.5% |
| | Glucose | 1 % |
| | Common salt | 0.5% |

In this medium, after inoculation with 3% of inoculating culture and 148 hours incubation and aeration at 26°C., 535 micrograms of pimaricin per ml of fermentation fluid was formed.

| | | |
|---|---|---|
| D. | Soy meal (coarse) | 5% |
| | Soy oil | 0.5% |
| | Concentrated corn steep liquor (50% solids) | 0.2% |
| | Glucose | 1% |
| | Primary potassium phosphate | 0.02% |
| | Ammonium sulphate | 0.5% |
| | Calcium carbonate | 1% |

With this medium, after inoculation with 3% of inoculating culture in a 15 liter fermentation flask and incubation and aeration during 168 hours at 28°C., 690 micrograms of pimaricin per ml of fermentation fluid was formed. After treatment of the mycelium which had been pressed off and stirred in a good deal of water with dilute alkali hydroxide, to pH = 10, 20.4 g. of pimaricin could be found in the mycelium filtrate.

EXAMPLE III (Isolation of crude pimaricin)

Four liters of a culture fluid, the fermentation of which was completed, which contained 590 micrograms/ml of pimaricin, was adjusted to pH = 10.0 with 10% sodium hydroxide and subsequently freed of the mycelium by filtration with the aid of Kieselguhr as filtering agent (2%). The culture filtrate, which had a volume of 3.7 liters with an activity of 570 micrograms/ml, was acidified with phosphoric acid to pH 3.0. This acidified filtrate was successively extracted with 750, 350 and 350 ml of n-butanol, respectively. The butanol extract was then washed with three times 120 ml of a 4% borax solution and then washed again with twice 120 ml of water. The butanol extract then contained 1,400 micrograms/ml. When this extract was evaporated azeotropically to 100 ml, 0.64 g. of not entirely pure pimaricin spearated in crystalline condition (act. 900 micrograms/ml). From the remainder of the extract a total quantity of 1.42 g. of impure pimaricin was obtained by further evaporation (act. 395 micrograms/mg). The yield referred to the total activity of the completely fermented fluid was 48.3%.

EXAMPLE IV (Isolation of crude pimaricin)

Fifteen liters of a culture fluid, the fermentation of which was completed, which contained 610 micrograms/ml of pimaricin, was adjusted to pH = 10.3 with 35% potassium hydroxide, and subsequently freed of the mycelium with the aid to 50 g. of Hyflo as filtering agent. The filtrate was then acidified to pH = 2.8 with phosphoric acid. The precipitate thus formed with filtered off, this time with the aid of 10 g. of Hyflo. The precipitate was then stirred for half an hour with 100 ml of n-butanol. After settling, the butanol extract was drawn off and the sediment was washed with 100 ml of water. The total butanol extract was washed three times with 10 ml of a 4% borax solution and subsequently three times with 10 ml of water. It was then evaporated at 44°C. in vacuo to 40 ml. After cooling to 0°C., suction, and drying, 0.51 g. of pale yellow crystalline pimaricin with an activity of 850 micrograms/mg was obtained. The filtered culture filtrate was subsequently processed in the manner described in Example I. The following two fractions were obtained: 3.21 g (act. 890 micrograms/mg) and 6.8 g (act. 223 micrograms/mg). The total yield amounted to 51.5%.

EXAMPLE V (Isolation of crude pimaricin)

Ten liters of completely fermented culture medium (act. 640 micrograms/ml) was adjusted to pH = 10 with 15% potassium hydroxide. Upon this the mycelium was centrifuged and the clear centrifugate was adjusted to pH = 6.9 with 10 N hydrochloric acid. It was subsequently extracted with successively 2,000, 1,000 and 1,000 ml of isoamyl alcohol. The combined isoamyl alcohol extracts were successively washed with three times 300 ml of 4% sodium carbonate solution, and then twice with 300 ml of water. The extract thus treated was evaporated azeotropically to 100 ml. In this process 2.62 g of pale yellow crystalline pimaricin with an activity of 900 micrograms/mg separated off. Yield, 36.8%.

EXAMPLE VI (Isolation of crude pimaricin)

Twenty liters of a completely fermented culture of Streptomyces natalensis (act. 700 micrograns/ml) was adjusted to pH = 10 with 20% sodium hydroxide. The mycelium was subsequently filtered off with the acid of Hyflo (200 g). The clear culture filtrate was extracted successively with 4,000 2,000 and 1,000 ml of n-butanol. The combined butanol extracts were washed twice with 500 ml of 4% borax solution and then twice with 500 ml of water. After the pH of the butanol extract thus treated had been adjusted to 6.8 with 10 N hydrochloric acid, the extract was evaporated azeotropically in vacuo to a volume of 250 ml. In this process 9.85 g of pale yellow crystalline pimaricin (act. 913 micrograms/mg) separated off. Yield: 60.8%.

EXAMPLE VII (Isolation of crude pimaricin from mycelium)

Fifteen liters of a completely fermented culture of Streptomyces natalensis nov. spec. was adjusted to pH = 4.1 with the aid of glacial acid. Subsequently 200 g of Hyflo was added as filtering agent, with which the solution was stirred. The mycelium was then pressed off to as dry as possible to a total weight of 1,700 g. (One gram of this mycelium in this condition was extracted for one hour with 40 ml of methanol in order to determine the number of micrograms of pimaricin. The methanolic extract was supplemented to 100 ml and subsequently measured spectrophotometrically. The content of pimaricin in this methanolic solution was 120 micrograms/ml.)

The pimaricin content of the total mycelium was 20.4 g. The pressed off mycelium was extracted for half an hour at room temperature with 8 liters of methanol in which 2% of calcium chloride had been dissolved. The extract thus obtained was diluted with 1 liter of water and freed of methanol in vacuo. In this process a crystalline precipitate of pimaricin was formed which, after suction, washing with water and drying in vacuo, weighed 14.73 g and had an activity of 900 micrograms/mg = 65% of the theoretical yield.

EXAMPLE VIII (Purification of pimaricin)

Ten grams of impure pimaricin (act. 890 micrograms/ mg) was dissolved with gentle heating in 80 ml of glacial acetic acid and then freed as quickly as possible of undissolved impurities by filtration. The clear filtrate, yellow-brown in color, was diluted with 1,500 ml water and the pH of the solution thus obtained was adjusted to 6.3 with the aid of 33% sodium hydroxide. After cooling, the crystalline precipitate formed was centrifuged and washed twice with a total quantity of 500 ml of water, and sucked off. On the filter the crystalline mass was washed again with 200 ml of water, upon which it was dired in vacuo over phosphorus pentoxide. The weight of the very pale yellow product thus obtained was 7.07 g and its activity was 960 micrograms/mg.

The above treatment was repeated with 60 ml of glacial acetic acid and 1,000 ml of water. The substance was washed with three times 200 ml of water. The product thus obtained weighed 5.35 g and had an activity of 995 micrograms/mg. Total yield: 59.8%.

EXAMPLE IX (Purification of pimaricin)

Ten grams of impure pimaricin (act. 890 micrograms/mg) was dissolved with gentle heating in 100 ml of dimethylformamide. This solution was filtered off with a view to removing undissolved impurities, the filter being washed again with 30 ml of dimethylformamide. To the brown-colored clear filtrate was added 250 ml of water, upon which the antibiotic precipitated in the crystalline state. The product was sucked off, the filter being washed again with 100 ml of water. The crystalline mass was subsequently dried in vacuo. The product thus obtained weighed 9.24 g. After the above treatment had been repeated, a pale yellow crystalline product was finally obtained which weighed 7.9 g and had an activity of 985 micrograms/mg. Total yield: 87.5%.

EXAMPLE X (Preparation of sodium salt)

A quantity of 2.5 g of pimaricin (act. 985 micrograms/mg) was suspended with mechanical stirring in 20 ml of methanol. Subsequently 0.145 g of sodium hydroxide dissolved in 0.3 ml of water was added to this suspension. The pimaricin, which at first dissolves, after a few minutes crystallizes as the sodium salt. After another 30 minutes stirring and 24 hours storage at 0° C. the crystalline mass was sucked off and washed with 5 ml of ethanol and 10 ml of diethyl ether. After drying in vacuo, the white needle-shaped crystalline sodium salt weighed 2.16 g (content 995 micrograms/mg = 87.3% of the calculated activity).

Other salts may be prepared in a similar manner.

The examples given above are for the purpose of illustration and it will be understood that various changes and modifications therefrom may be used without departing from the principles of the invention or the scope of the following claims.

What we claim is:

1. A substance having antibiotic properties in relation to saprophytic and parasitic fungi and yeasts which in the pure state is a white crystalline compound which begins to decompose at about 150°C., gives no color reaction with ferric chloride, which gives the concentrated phosphoric acid a pink, unstable color, which decolorizes bromine water, which is slightly soluble in water (about 8 mgs. in 100 ml at 20°C.) and more soluble in alcohols and is soluble in pyridine, dimethylformamide, dimethylacetamide, glacial acetic acid, and alkali hydroxides, which is practically insoluble in aliphatic hydrocarbons, has a specific roatation $\alpha_D^{25} = +250°$ (in a concentration of 0.083% in 100% methanol), which has a molecular weight of about 685 and an empirical formula of $C_{33}H_{50}NO_{14}$, and which displays maximum absorption of ultra violet light at 290, 304 and 318 m$\mu$ with a shoulder at about 280 and a minimum at about 250 m$\mu$ and in a potassium bromide plate exhibits the following infra red absorption (in $cm^{-1}$): 3460, 2985, 1721, 1637, 1577, 1441, 1401, 1381, 1275, 1269, 1238, 1192, 1176, 1136, 1109, 1066, 1006, 988, 948, 887, 855, 844, 803, 794.

2. A process for producing pimaricin, said pimaricin being the substance of claim 2, which comprises cultivating Streptomyces natalensis NRRL 2651 in an aqueous nutrient medium under submerged aerobic conditions at a temperature between about 15°C and about 30°C for a period of from 2 to 14 days, and recovering the so produced pimaricin from the resulting fermentation liquor.

3. A process for producing pimaricin, said pimaricin being the substance of claim 2, which comprises cultivating Streptomyces natalensis NNRL 2651 in an aqueous nutrient-containing, carbohydrate solution having a pH from 6.5 to 8, under submerged aerobic conditions, at a temperature between about 15°C. and about 30°C. for from two to five days and recovering the pimaricin from the resulting fermentation liquor.

4. A process for the production of pimaricin, said pimaricin being the substance of claim 2, which comprises cultivating Streptomyces natalensis NRRL 2651 under submerged aerobic conditions in an aqueous nutrient medium having a pH between 6.5 and 8 and containing a soluble carbohydrate and a source of assimilable nitrogen at temperatures within the range from about 15°C. and about 30°C. for a period of time of about two to five days, whereby the aqueous nutrient medium is fermented and pimaricin is produced, separating the active fluid from insolubles and mycelium, extracting the active fluid with an organic solvent miscible with water to a limited extent and recovering said pimaricin from said organic solvent.

5. The process of claim 4 wherein said insolubles and mycelium are extracted with methanol to recover residual pimaricin values.

6. The process of claim 4 wherein the recovery of pimaricin includes the step of extracting the active fluid into butyl alcohol at a pH of about 3.

* * * * *

UNITED STATES PATENT OFFICE
CERTIFICATE OF CORRECTION

Patent No. 3,892,850             Dated July 1, 1975

Inventor(s) ADRIANUS PETRUS STRUYK and JACQUES MAURITS WAISVISZ

It is certified that error appears in the above-identified patent and that said Letters Patent are hereby corrected as shown below:

| Col. | Page | Line | Page | |
|---|---|---|---|---|
| [73] | | | | Assignee "Gist-Brocades N.V., Delft, The Netherlands" should be --Koninklijke Nederlandsche Gist-En Spiritusfabriek, N.V. Delft, The Netherlands-- |
| [30] | | | | Priority No. "5620534" should be --205,345-- |
| 3 | 5 | 5 | 21 | speices" should be --species-- |
| 5 | 13 | 10 | 17 & 18 | "socalled" should be --so called-- |
| 5 | 43 | 11 | 15 | "$C_{34}H_{49}NO_{14}$" should be --$C_{33}H_{50}NO_{14}$-- |
| 5 | 52to54 | 11 | 23to25 | Do not correspond with the original underlined numbers should be --3460, 2985, 1721, 1637, 1577, 1441, 1401, 1381, 1275, 1269, 1238, 1192, 1176, 1136, 1109, 1066, 1006, 988, 948, 887, 855, 844, 803, 794 -- |

UNITED STATES PATENT OFFICE
CERTIFICATE OF CORRECTION

Patent No. 3,892,850  Dated July 1, 1975

Inventor(s) ADRIANUS PETRUS STRUYK and JACQUES MAURITS WAISVISZ

It is certified that error appears in the above-identified patent and that said Letters Patent are hereby corrected as shown below:

| Col. | Page | Line | Page | |
|---|---|---|---|---|
| 7 | 13 | 14 | 15 | "limted" should be --limited-- |
| 9 | 21 | 18 | 7 | "spearated" should be --separated-- |
| 10 | 7 | 19 | 21 | "microgans/ml" should be --microgams/ml-- |
| Claim 2 line 15 | | | | "Claim 2" should be --Claim 1-- |
| Claim 3 line 23 | | | | "Claim 2" should be --Claim 1-- |
| Claim 4 line 31 | | | | "Claim 2" should be --Claim 1-- |

Signed and Sealed this thirteenth Day of January 1976

[SEAL]

Attest:

RUTH C. MASON
Attesting Officer

C. MARSHALL DANN
Commissioner of Patents and Trademarks